United States Patent [19]

Kaelin

[11] Patent Number: 4,666,611

[45] Date of Patent: * May 19, 1987

[54] SEWAGE-AERATION SYSTEM, AND METHOD FOR THE OPERATION AND USE THEREOF

[76] Inventor: Joseph R. Kaelin, Beckenriedstrasse 58, CH-6374 Buochs, Switzerland

[ * ] Notice: The portion of the term of this patent subsequent to Aug. 14, 2001 has been disclaimed.

[21] Appl. No.: 679,586

[22] Filed: Dec. 7, 1984

[30] Foreign Application Priority Data

Dec. 7, 1983 [CH] Switzerland ........................ 6539/83

[51] Int. Cl.⁴ .............................................. B01F 3/04
[52] U.S. Cl. .................................... 210/758; 210/219; 210/320; 261/87; 261/91; 261/93
[58] Field of Search ...................... 210/219, 220, 221.2, 210/758, 320, 199; 261/87, 91, 93

[56] References Cited

U.S. PATENT DOCUMENTS

| | | |
|---|---|---|
| 3,576,316 | 4/1971 | Kaelin .............................. 210/219 X |
| 3,637,196 | 1/1972 | Kaelin .............................. 210/219 X |
| 4,021,349 | 3/1977 | Kaelin ................................. 210/219 |
| 4,465,645 | 8/1984 | Kaelin .............................. 210/219 X |
| 4,468,358 | 8/1984 | Haegeman ...................... 210/219 X |

*Primary Examiner*—Tom Wyse
*Attorney, Agent, or Firm*—Eric P. Schellin

[57] ABSTRACT

A surface-aeration rotor is provided with a carrier-part connected to a vertical drive-shaft. Secured adjustably to the carrier-part are several liquid-conveying units each consisting of a scoop and two flow-guiding walls. In order to improve the oxygen-input performance per kilowatt of rotor-drive power, the liquid-conveying units are designed in such a manner that the scoops are disposed in a plane which is twisted and which is curved in the direciton of rotation of the rotor, whereby the jets of liquid emerge from the rotor standing on edge.

12 Claims, 7 Drawing Figures 4,666,611

SEWAGE-AERATION SYSTEM, AND METHOD FOR THE OPERATION AND USE THEREOF

This invention relates to a surface-aeration rotor for circulating and aerating water, and more particularly sewage-water in a sewage-treatment plant, the rotor comprising a carrier-part connected to a vertical drive-shaft and including a plurality of liquid-conveying units secured to the carrier-part. Each liquid-conveying unit comprises at least one scoop and a flow-guiding wall associated therewith, the inlet-side thereof being, when the unit is in operation, below the water-level, while at least most of the outlet-side thereof is above the water-level. The invention also relates to a method for operating this surface-aeration rotor, and to the use thereof.

Hitherto known surface-aeration rotors have the disadvantage that the rotor-driving power necessary for introducing oxygen into the sewage-water to be aerated is relatively high.

It is a purpose of the present invention to provide a surface-aeration rotor which requires considerably less driving power for a given oxygen-input.

According to the invention, in the case of a surface-aeration rotor of the type hereinbefore referred to this purpose is achieved in that the individual water-conveying units are so designed that the scoops are disposed, at least approximately, in a plane which is twisted and which is curved in the direction of rotation of the rotor, and in that the angle of attack of the upper outlet-side is between 60° and 105°, while the angle of attack, amounting to at least 35° less, of the lower inlet-side is between 0° and 50°.

In this connection, it is desirable for the flow-guidance direction of the twisted scoop-plane to be disposed at least approximately in the radial plane of the rotor.

In order to obtain the desired outlet flow direction, it is desirable for a flow-guiding wall, extending away from the scoop in the direction of rotation of the rotor, to be disposed along at least a part of the upper longitudinal edge of the scoop which projects at least partly out of the water when the rotor is in operation. In this connection it is also desirable for another flow-guiding wall, extending away from the scoop in the direction of rotation of the rotor, to be disposed along at least a part of the lower longitudinal edge of the scoop which projects at least partly from the water when the rotor is in operation.

In order to achieve the desired form of outlet-flow it is also desirable for the angle of attack of the upper outlet side to be between 75° and 90°.

In order to prevent the flow-resistance opposing the rotation of the rotor from becoming too high, it is advisable for the angle of attack of the lower inlet-side to be between 20° and 40°.

In order to be able to use the same liquid-conveying units indiscriminately for different rotor-diameters, rotational speeds, tank sizes and tank shapes, etc., it is desirable for these units to be secured to the carrier-part in such a manner as to be adjustable about a horizontal and preferably also a vertical axis.

Further advantageous features of the surface-aeration rotor according to the invention appear in claims 8 to 13.

The present invention is also concerned with a method for operating surface-aeration rotors according to the invention this method being characterized in that rotors assembled according to the modular system, and having different diameters but the same liquid-conveying units, are driven at the same peripheral velocity.

The present invention also relates to the use of the surface-aeration rotor according to the invention in a sewage-water aeration tank, characterized in that arranged below the rotor, and coaxially with the axis of rotation thereof, is a flow-guiding pipe extending to the bottom area of the tank, this pipe being provided with a stationary flow-guidance unit at its inlet and/or outlet end. In order to prevent surface-water being drawn from the surface directly back into the rotor, it is desirable for the outer side of the rotor to be surrounded by an immersed baffle wall extending above the surface of the water and preferably connected to the flow-guiding pipe by a connecting part in the form of a truncated conical casing.

The present invention also relates to the use of the surface-aeration rotor according to the invention in a sewage-water aeration tank, characterized in that arranged therein is at least one flow-decelerating plate extending horizontally and/or vertically.

The invention is explained hereinafter, by way of example, in conjunction with the drawings attached hereto, wherein.

Figure 1:
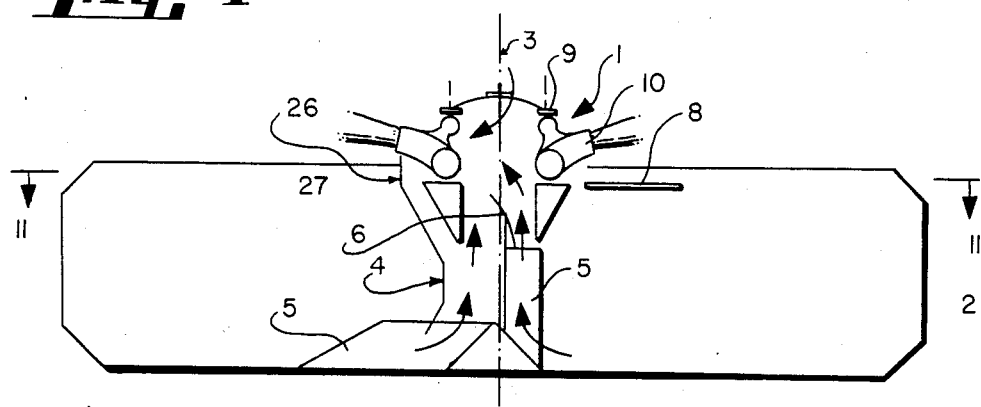
FIG. 1 is a cross-section through a sewage-water aeration tank containing an embodiment of a surface-aeration rotor according to the invention.
Figure 2:
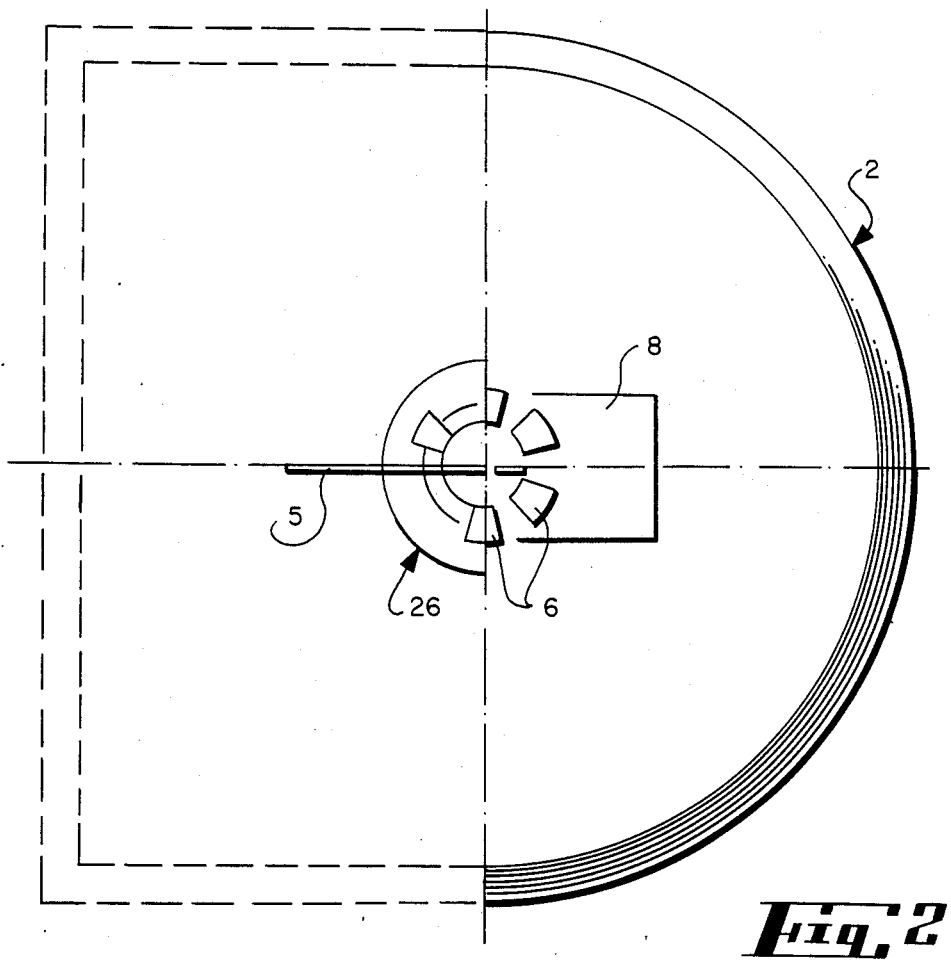
FIG. 2 is a cross-section on the line II—II in FIG. 1, the left-hand half showing a tank which is square in plan view and the right hand half showing a tank which is circular in plan view.

In FIGS. 1 and 2, a surface-aeration rotor 1 is arranged in the sewage-aeration tank 2 of a treatment-plant. In order to achieve circulation and aeration of the total contents of the tank, a flow-guiding pipe 4, extending to the bottom area of the tank, is provided (shown only in the embodiment illustrated in the left-hand half of FIGS. 1 and 2) below the rotor 1 and coaxially with the axis of rotation 3 thereof. In order to ensure spin-free inflow of the sewage-water to be aerated into the suction end of the flow-guiding pipe 4, a stationary first flow-guidance unit 5 is provided at this end at the bottom of the aeration-tank 2.

Provided at the outlet end, facing the suction-side of the rotor 1, of the flow-guiding pipe 4 is a second stationary flow-guidance unit 6 which directs the sewage-water to be aerated, and flowing out of the flow-guiding pipe 4, in the manner necessary to ensure optimal oxygen-input, by the rotor, to the suction-side thereof.

In the embodiment illustrated in the right-hand half of FIGS. 1 and 2, the first stationary guidance unit 5 extends from the bottom of the tank to the underside of the second stationary flow-guidance unit 6.

A horizontally arranged damper-plate 8 is provided to prevent any undesirable pulsating of the sewage-water in the tank 2.

The design of the liquid-conveying units 10, which are secured individually to a carrier-ring 9 of the rotor 1, is shown in FIGS. 3 to 6.

As shown in these figures, the liquid-conveying units 10 are each designed in such a manner that a scoop 11 extends in a plane which is curved in the direction of rotation V of the rotor 1 and is twisted, whereby the flow-guidance direction thereof is disposed at least approximately, in the radial plane of the rotor.

In order to allow the liquid which is to be aerated and which is taken up relatively flatly, to be expelled from the individual liquid-conveying units with as little power as possible and in the form of a flat jet disposed vertically on edge above the surface of the water, the angle of attack $\beta$ of upper outlet-side 12 is between 75° and 90°, while the angle of attack $\alpha$ of the lower inlet-side 13 is between 20° and 35°.

In order to ensure that the water taken up by the scoop-surface 11 does not flow away undesirably over the upper longitudinal side 14 of the scoop, but is deflected in the right direction over the scoop outlet-side 12, a flow-guiding wall 15 is provided to extend away from the scoop 11 in direction of rotation V of the rotor 1. In this connection, the angle $\lambda$ between the scoop 11 and the upper flow-guiding wall 15 is between 90° and 75°, so that the latter is disposed approximately horizontally.

Provided on the lower second longitudinal side 16 of the scoop, most of which projects out of the water when the rotor is in operation, is a second flow-guiding wall 17 which extends away from the scoop in the direction of rotation of the rotor for the purpose of correct deflection of the water taken up by the scoop, the angle $\delta$ between the rotor and the scoop being about 90°.

Since, as a result of the rotation of the rotor, water taken up by the scoop 11 is accelerated out of the individual liquid-conveying units, it is desirable in order to adapt to these flow conditions for the scoop inlet-side 13, as seen at right angles to the direction of flow, to be at least 1.2 times as long as the scoop outlet-side 12.

Figure 3:
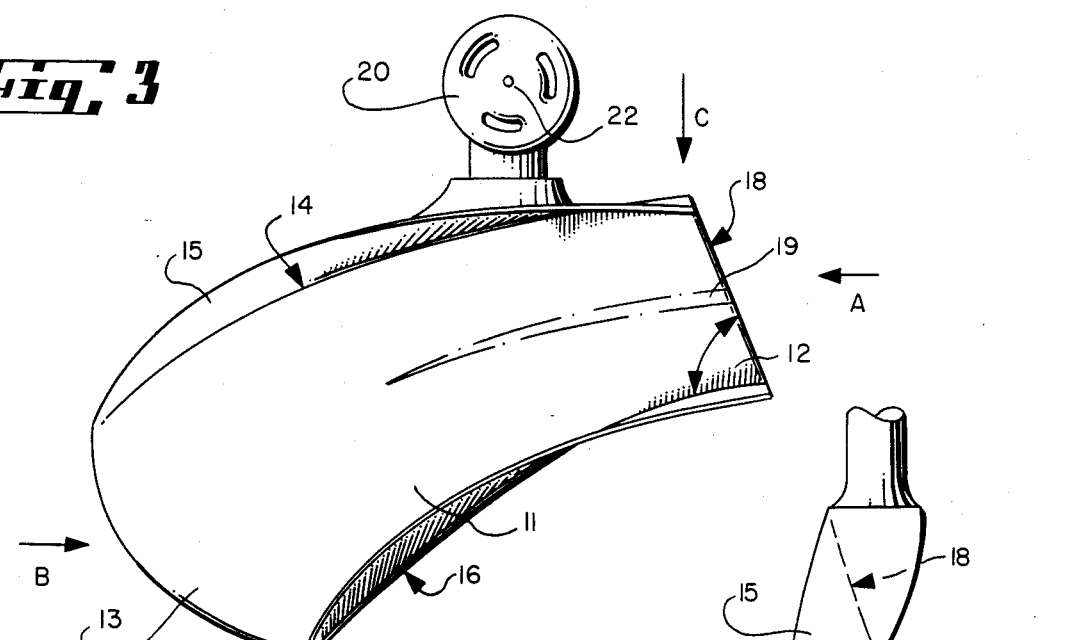
FIG. 3 is a view of an embodiment of a liquid-conveying unit for the rotor in FIG. 1.
Figure 5:
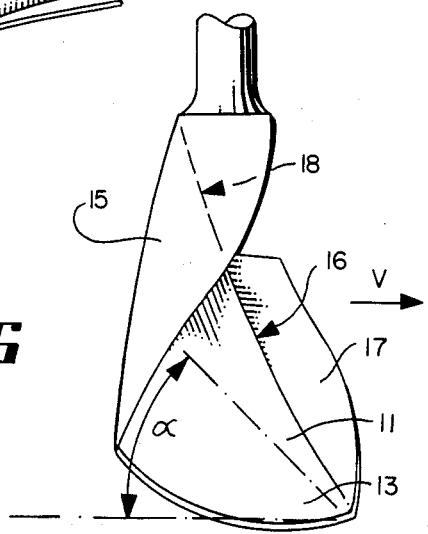
FIG. 5 is a front elevation of the inlet-side of the liquid-conveying unit illustrated in FIG. 3.
Figure 6:
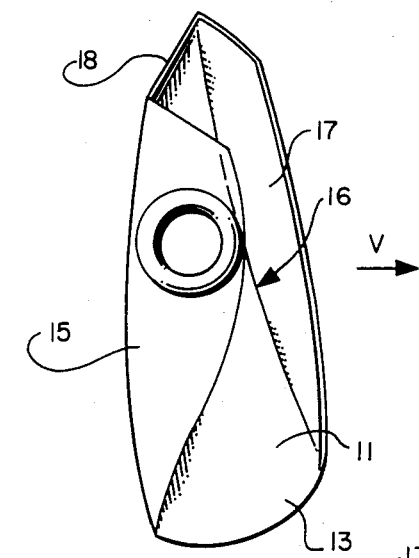
FIG. 6 is a plan view of the liquid-conveying unit illustrated in FIG. 3.
Figure 4:
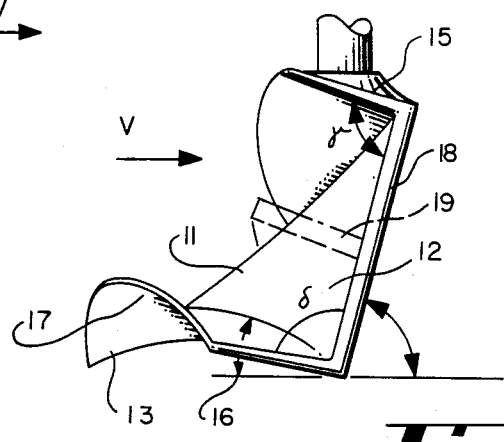
FIG. 4 is a front elevation of the outlet-side of the liquid-conveying unit illustrated in FIG. 3.

As shown particularly in FIG. 3, the scoop outlet-edge 18 projects downwardly at an angle of attack $\epsilon$ of about 65° to 70° to the horizontal.

Where large liquid-conveying units are used, it may be desirable, as shown in dotted lines in FIGS. 3 and 4, to provide a jet-dividing wall 19, extending in the direction of flow, approximately along the centre of the flow on each scoop.

Figure 7:
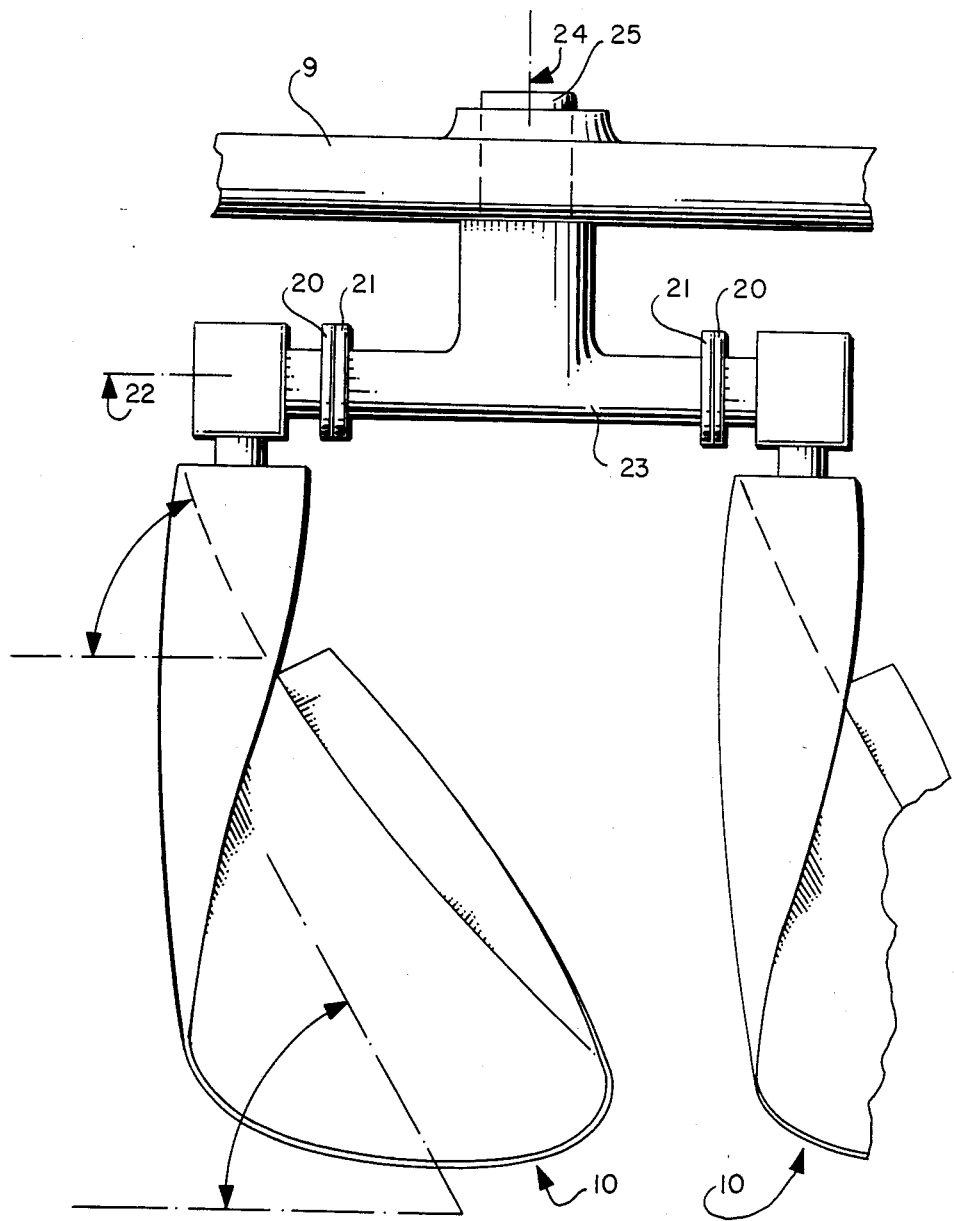
FIG. 7 is a side elevation, by way of example, of the connection between two liquid-conveying units and the rotor carrier-ring.

In order to be able to adapt the individual liquid-conveying units 10 optimally to the purpose for which they are intended and, at the same time, to manage with the smallest possible number of standard sizes, it is desirable as shown in FIG. 7 for the individual liquid-conveying units to be adjustable, by means of flanges 20, 21 connected together by bolts (not shown), about a horizontal axis 22 and, by means of a rocket 23, about a vertical axis 24, the rocker in turn being connected to the carrier-part 9 of the rotor 1 by a vertical trunnion 25. This allows the individual units 10 to be set to neutral, trailing, or leading outflow. It is also possible to adjust the rockers 23 in such a manner that the two liquid-conveying units arranged thereon are displaced in relation to each other at two different diameters.

In order to prevent sewage-water which has just been aerated by the rotor 1 and which is still near the surface from returning immediately into the suction area of the rotor it is desirable, as shown in FIG. 1, for the outside of the rotor to be surrounded by an immersed baffle wall 26 extending above the surface of the water, this baffle wall being connected by a connecting part 27, in the form of a truncated-conical casing, to the flow-guiding pipe 4. The guidance-unit 6, equipped with curved scoops, is arranged within this conical connecting part 27.

In designing this rotor 1, it is desirable to assume that, being assembled according to the modular system and comprising similar liquid-conveying units, it will always be operated at the same peripheral velocity, the number of liquid-conveying units being varied primarily to achieve the desired oxygen-input.

I claim:

1. A surface-aeration rotor for circulating and aerating sewage-water in a sewage-treatment plant, the rotor comprising a carrier-part connected to a vertical drive-shaft, and a plurality of liquid-conveying units secuured to the carrier-part, each liquid-conveying unit comprising at least one scoop and two flow-guiding walls associated therewith, with an inlet-side thereof being, when the unit is in operation, below the water-level, and most of the outlet-side is above the water-level, each scoop being disposed in a plane which is twisted and is curved in the direction of the radial plane of the rotor, and the angle of attack of the upper outlet-side is between 60° and ±05° while the angle of attack, amounting to at least 35° less, of the lower inlet-side is between 0° and 50°; said scoop inlet-side being at least 1.2 times as long as the scoop outlet-side, and the angle between the scoop and the upper flow-guiding wall and/or between the scoop and the lower flow guiding wall is between 60° and 120°.

2. A rotor according to claim 1, wherein a flow-guiding wall which extends away from the scoop in the direction of rotation of the rotor, is provided along at least a part of the upper longitudinal side of the scoop which projects at least partly out of the water when the rotor is in operation.

3. A rotor according to claim 2, wherein a flow-guiding wall which extends away from the scoop in the direction of rotation of the rotor, is provided along at least a part of the lower longitudinal side of the scoop which projects at least partly out of the water when the rotor is in operation.

4. A rotor according to claim 3, wherein the individual liquid-conveying units are so connected to the carrier-part as to be adjustable about a horizontal axis, and prefereably also about a vertical axis.

5. A rotor according to claim 4, wherein the scoop outlet-edge projects downwardly at an angle of attack of 50° to 90° relative to the horizontal.

6. A rotor according to claim 5, wherein the outflow-direction of the liquid-conveying units is in a range between the horizontal and a direction running at 30° outwardly and upwardly.

7. A rotor according to claim 6, wherein at least some of the liquid-conveying units are each equipped with a jet-diving wall disposed in the outflow-direction.

8. A method for the operation of surface-aeration rotors according to claim 1, wherein rotors assembled according to the modular system, and having different diameters but the same liquid-conveying units, are driven at the same peripheral velocity.

9. A sewage-water aeration tank incorporating a surface-aeration rotor according to claim 1, wherein a flow-guiding pipe which extends to the bottom area of the tank is disposed below the rotor and coaxially with the axis of rotation thereof, said pipe being provided with a stationary flow-guidance unit at the inflow and/or the outflow end thereof.

10. An aeration tank according to claim 9, wherein the rotor is surrounded on its outer side by an immersed baffle wall which extends above the surface of the water and is preferably connected to the flow-guiding pipe by a connecting part in the form of a truncated-conical casing.

11. A sewage-water aeration tank incorporating a surface-aeration rotor according to claim 1, wherein at least one flow-decelerating plate which extends horizontally and/or vertically is provided in the tank.

12. A surface-aeration rotor for circulating and aerating water, and more particlularly sewage-water in a sewage-treatment plant, the rotor comprising a carrier-part connected to a vertical drive-shaft, and a plurality of liquid-conveying units secured to the carrier-part, each liquid-conveying unit comprising at least one scoop and two flow-guiding walls associated therewith, with the inlet-side thereof being, when the unit is in operation, below the water-level, while at least most of the outlet-side is above the water-level, each scoop being disposed in a plane which is twisted and which is curved in the direction of rotation of the rotor, and the angle of attack of the upper outlet-side being between 70° and 90°, while the angle of attack, amounting to at least 35° less, of the lower inlet-side is between 20° and 40°.

* * * * *

UNITED STATES PATENT AND TRADEMARK OFFICE
CERTIFICATE OF CORRECTION

PATENT NO. : 4,666,611
DATED : May 19, 1987
INVENTOR(S) : JOSEPH R. KAELIN

It is certified that error appears in the above—identified patent and that said Letters Patent is hereby corrected as shown below:

Claim 1, line 27, please delete $\pm 05°$ and insert --105°--.

Signed and Sealed this

Twenty-fifth Day of August, 1987

Attest:

DONALD J. QUIGG

Attesting Officer  Commissioner of Patents and Trademarks